(12) United States Patent
Kudoh et al.

(10) Patent No.: US 7,694,890 B2
(45) Date of Patent: Apr. 13, 2010

(54) PASSIVE ULTRASONIC TAG AND METHOD AND SYSTEM FOR READING RECORDED INFORMATION

(75) Inventors: Yoshiharu Kudoh, Machida (JP); Hitoshi Nishino, Zushi (JP); Kenji Tsuboi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 11/779,504

(22) Filed: Jul. 18, 2007

(65) Prior Publication Data

US 2008/0018429 A1  Jan. 24, 2008

(30) Foreign Application Priority Data

Jul. 18, 2006 (JP) .............................. 2006-195422

(51) Int. Cl.
*G06K 19/06* (2006.01)
(52) U.S. Cl. ........................................ 235/494; 367/87
(58) Field of Classification Search ................. 235/494; 367/2, 6, 87
See application file for complete search history.

(56) References Cited

U.S. PATENT DOCUMENTS

| | | | | |
|---|---|---|---|---|
| 3,209,129 A | * | 9/1965 | Sundblad | ..................... 235/441 |
| 4,173,139 A | * | 11/1979 | Conn | ......................... 73/1.84 |
| 5,608,199 A | * | 3/1997 | Clouse et al. | ................ 235/435 |
| 6,149,060 A | * | 11/2000 | Meadows | .............. 235/462.01 |
| 2008/0291815 A1 | * | 11/2008 | Edwards | ..................... 369/283 |

FOREIGN PATENT DOCUMENTS

| | | |
|---|---|---|
| JP | H04-115387 | 4/1992 |
| JP | H09-044620 | 2/1997 |
| JP | 2000-082121 | 3/2000 |
| JP | 2004-021701 | 1/2004 |
| JP | 2005-011103 | 1/2005 |

\* cited by examiner

*Primary Examiner*—Michael G Lee
*Assistant Examiner*—Suezu Ellis
(74) *Attorney, Agent, or Firm*—Shimokaji & Associates, P.C.

(57) ABSTRACT

A passive ultrasonic tag is provided and an ultrasonic reading system is constructed more simply and records and/or reads information more reliably by using ultrasonic waves for transmission/reception. A passive ultrasonic tag according to a first embodiment of this invention includes a tag body. The tag body has two or more holes disposed extensively on a surface of the tag body. The holes have bottoms at predetermined depths from the surface of the tag body. The depths of at least two of the two or more holes are set to different values. As a result, when a three-dimensional range including surfaces and bottoms of the two holes is scanned using ultrasonic waves, the ultrasonic waves are reflected in different manners on the basis of the depths of the two holes. This allows information to be recorded and read.

1 Claim, 13 Drawing Sheets

PASSIVE ULTRASONIC TAG AND METHOD AND SYSTEM FOR READING RECORDED INFORMATION

CROSS REFERENCES TO RELATED APPLICATIONS

This application is related to Japanese Patent Application No. 2006-195422, filed Jul. 18, 2006.

FIELD OF THE INVENTION

This invention relates to the field of wireless communications. More specifically, it relates to recording of information on a tag and reading of the information recorded on the tag using reflection of ultrasonic waves.

BACKGROUND ART

Recently, the need for management of product-specific information, management of tracking information, and the like has been increased and there has been a growing trend toward introduction of contactless tags. Among others, applications of a radio frequency identification (RFID) system using a tag and a reader have actively been studied. Such applications include one in which by conducting wireless communications in which a query signal is broadcast to a product to which a tag is attached, an object to which a tag is attached, or a human body to which a tag is attached and then after obtaining a response from such a tag, stock control of the product, observation of the moving object, or observation of behavior of the human is conducted.

Typical RFID systems use electromagnetic waves. On the other hand, there have also been demands to apply an RFID system to environments in which RFID systems cannot operate, such as an environment in which electromagnetic radiation is present, a situation in which the tag is embedded in water or metal, or an environment in which the tag is affected by electromagnetic shielding caused by metal. Moreover, there is a report that some types of electromagnetic waves may negatively affect the health of human bodies, so concerns about safety of electromagnetic waves have not completely been dispelled.

For a tag using electromagnetic waves, power to drive the tag, such as absorbing energy of a query signal to activate a chip inside the tag must be supplied by electromagnetic induction or via microwaves from the reader. Therefore, disposition of an internal circuit for power supply must be considered, thereby requiring a minimum of one complex system. Thus, under a harsh environment in which the tag is subjected to physical or chemical stress, such as that caused by staining of the surface, peeling, corrosion, or wear, there is no guarantee that reliability of operation of the tag will be maintained.

Ultrasonic tags, which use ultrasonic waves instead of electromagnetic waves, have been considered. These tags are active tags, a type of tag in which an ultrasonic transmitter is disposed for transmitting ultrasonic waves in the vicinity of the ultrasonic tag. In these ultrasonic tags, the communication distance between the tag and reader can be made longer to a degree that ultrasonic waves transmitted from the tag can reach the reader. These tags have been applied to technologies, such as one that calculates the distances from one tag to a plurality of readers by using the differences in the time taken for ultrasonic waves transmitted from the tag to reach the respective readers, and by identifying the three-dimensional location of the tag by three-point measurement based on these distances.

However, with regard to active tags, the use of a complex system, such as an energy supply system, is unavoidable due to the need to transmit ultrasonic waves near the active tags. Such a complex system will be costly in terms of battery replacement or charging.

On the other hand, passive tags have a relative advantage in that while they make some compromise in terms of communication distance, they require no battery and can easily be downsized. However, as for passive RFID tags using electromagnetic waves, complexity is unavoidable, such as including an IC chip and antenna.

SUMMARY OF THE INVENTION

It is desirable to provide a passive ultrasonic tag and an ultrasonic reading system that are constructed more simply and record and/or read information more reliably by using ultrasonic waves for transmission/reception.

Means for Solving the Problems

A passive ultrasonic tag (100) according to a first embodiment of this invention includes a tag body (102). The tag body has two or more holes (106, 108, 110) disposed extensively on a surface (104) of the tag body. The holes have bottoms (112, 114, 116) at predetermined depths (d1, d2, d3) from the surface of the tag body (z). Depths of at least two of the two or more holes are set to different depths (d1≠d2, d1≠d3, or d2≠d3). As a result, when a three-dimensional range (104 to C+) including the surfaces and bottoms of the two holes is scanned using ultrasonic waves, the ultrasonic waves are reflected in different manners (R1, R2, R3) based on the depths of the two holes.

A passive ultrasonic tag (200) according to a second embodiment of this invention includes a tag body (202). The tag body has one or a plurality of surface portions (206, 208, 210) distributed on a surface (204) of the tag body. Each surface portion is made of a propagation medium having a density different from the density of the tag body. As a result, when the surface (204) of the tag body and the one or plurality of surface portions (206, 208, 210) are scanned using ultrasonic waves, the ultrasonic waves are reflected in different manners (R4, R5, R6, R7) off the surface (204) of the tag body or the one or plurality of surface portions (206, 208, 210).

DETAILED DESCRIPTION

Definition of Terms

"Ultrasonic waves" refers to a sound having a frequency of 20 kHz or more that cannot generally be heard by the human ear. Ultrasonic waves have been used in various applications, such as medical ultrasonic (echo) equipment, cleaners, fishfinders, and back sonars. Also in this invention, it is assumed that a sound having a frequency of 20 kHz or more is used.

In this embodiment, a "tag" is described as an entity that is to be attached to a product or an object and that has a rectangular surface and is relatively thin in the depth direction (thickness). This is intended to facilitate the understanding of the tag. If a hole can directly be made in the entity or a density difference can directly be set up in the entity itself, this invention can be applied to "tag bodies" of various shapes or thicknesses. Therefore, the term "tag" and the term "tag body," on which "tag" is based, should not be interpreted in a limited manner depending on shape or thickness, but rather should be interpreted broadly.

An "ultrasonic reader" refers to a device that has a function (receiving function) of reading reflected ultrasonic waves, as represented by the expression "reader." However, besides the function of reading, the ultrasonic reader may also have a function (transmitting function) of emitting ultrasonic waves to a tag. In embodiments of this invention, both the receiving and transmitting functions will be described.

The term "scan" refers to "scan" in both transmission and reception or refers to "scan" in either of transmission and reception. Scan type will be determined as appropriate in terms of the context. The ultrasonic tag according to this invention is intentionally given a limiting name of "passive ultrasonic tag" on the ground that it is scanned (passively). The passive ultrasonic tag is scanned over the one-dimensional range shown in the X direction, the two-dimensional range shown by the X and Y directions, or the three-dimensional range shown by the X, Y, and Z directions.

[Properties of Ultrasonic Wave]

A first property of an ultrasonic wave is that the propagation velocity of an ultrasonic wave is remarkably low compared with that of radio waves or the like. The propagation velocity of an ultrasonic wave is highest in a solid, second highest in a liquid, and third highest in air, that is, it is largely affected by the medium through which the ultrasonic wave propagates. The propagation velocity of an ultrasonic wave in air is approximately one-fifteenth that in a solid. The propagation velocity v of an ultrasonic wave is not dependent on the frequency of the ultrasonic wave, but rather determined by dividing the density of the substance through which the ultrasonic wave propagates by the elastic modulus of the substance. The propagation velocity v is obtained by the formula below.

$$\text{Propagation velocity } v \text{ (m/second)} = \sqrt{\text{elastic modulus (Pa)/density (kg/m3)}} \quad (1)$$

A second property of an ultrasonic wave is that an ultrasonic wave is apt to reflect; for example, it is not transmitted through glass or the like. Such reflection is caused by a change in acoustic impedance due to the density difference. Therefore, an ultrasonic wave does not propagate through the boundary between propagation media where there is a large change in acoustic impedance (density ρ of propagation medium×propagation velocity v) but reflects from the boundary.

A third property of an ultrasonic wave is that an ultrasonic wave has sharper "directivity" and is attenuated more at a higher frequency. As the area of the vibration surface becomes larger relative to the wavelength or the wavelength becomes shorter, an ultrasonic wave has sharper directivity.

A fourth property of an ultrasonic wave is that there has been no report that an ultrasonic wave harms human bodies and it is assumed that an ultrasonic wave is safe in principle. In practice, ultrasonic examination has been indispensable in current obstetrics and gynecology. Unlike X-ray examination or the like, ultrasonic examination has been deemed a safe examination that has no risk of affecting a fetus. This examination has been used in stomach and heart diagnoses and in pediatrics.

Here, a degree C of proximity between the reader and tag refers to the shortest distance between the representative surface 22 of the ultrasound reader 20 and a representative portion of the passive ultrasonic tag 100 from which the ultrasonic wave is reflected. This means a substantial (wireless) communication distance. The reason for using the expression "representative portion" is that when the passive ultrasonic tag 100 is scanned, the ultrasonic wave is not reflected only from a particular portion of the passive ultrasonic tag 100 such as a surface thereof. The passive ultrasonic tag according to this invention is constructed such that an ultrasonic wave is reflected from different portions of the tag, in order to achieve the purpose of actively recording information on the tag.

Use of the ultrasonic reader 20 allows not only the condition of the surface of the passive ultrasonic tag 100 but those of inner portions thereof to be known. The conditions of inner portions of the passive ultrasonic tag 100 can be observed, for example, by (1) moving the ultrasonic reader 20 itself physically toward or away from the passive ultrasonic tag 100, (2) changing the phase of ultrasonic T transmitted from the ultrasonic reader 20, or (3) sighting in the depth direction of the passive ultrasonic tag 100 variable as shown by C+ using an acoustic lens or the like and thereby scanning the tag three-dimensionally.

Figure 2:
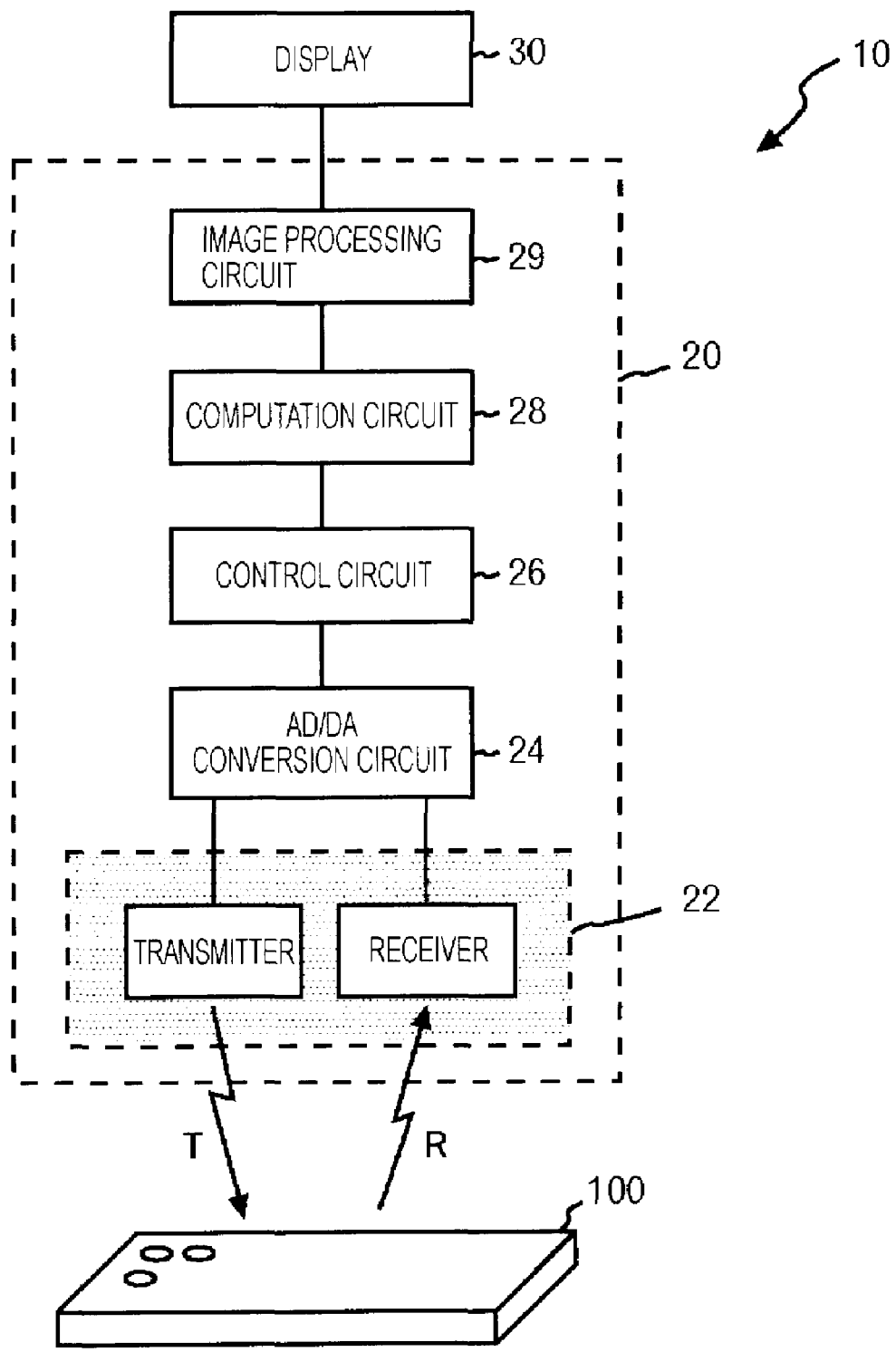

FIG. 2 is a schematic block diagram of the ultrasonic reading system 10 centering on the ultrasonic reader 20. The ultrasonic reader 20 includes a transmitter for transmitting ultrasonic waves via the representative surface 22 and a receiver for receiving ultrasonic waves reflected from the passive ultrasonic tag 100 via the representative surface 22. The transmitter and receiver are coupled to an AD/DA conversion circuit 24, which is coupled to a control circuit 26, which is coupled to a computation circuit 28, which is coupled to an image processing circuit 29, which is coupled to a display 30.

For example, when scanning the passive ultrasonic tag 100, it is possible to continuously grasp the reception condition of an ultrasonic wave in the two-dimensional range at each depth by changing the depth dimension by the control circuit 26. Also, in the computation circuit 28, it is possible to compare the ultrasonic wave reception condition in the two-dimensional range at one depth with that at another depth.

When displaying these comparison results on the display 30 such as a CRT display, an LCD, or a plasma display, the different reflection conditions of an ultrasonic wave can be visualized, for example, by producing light and shade on the display in proportion to the amplitude of the reflected ultrasonic wave. Which of the AD/DA conversion circuit 24, control circuit 26, computation circuit 28, and image processing circuit 29 are included in the ultrasonic reader 20 shown in FIG. 1 can be determined by those skilled in the art as appropriate.

Figure 3:
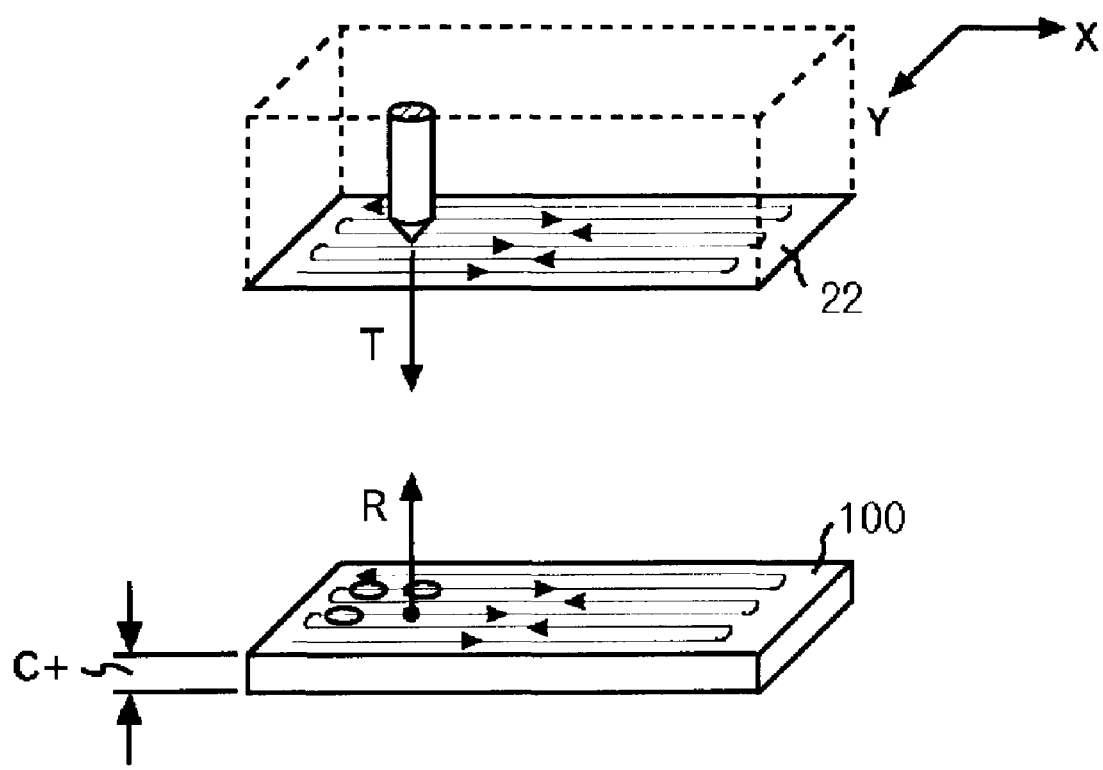

FIG. 3 is a schematic view showing scanning performed by a single probe. An ultrasonic wave with directivity such as the arrow T is transmitted from the tip of the single probe and reflected by the passive ultrasonic tag 100 in a direction such as that indicated by the arrow R. This scanning is performed only on a local point of the passive ultrasonic tag 100 corresponding to the tip of the probe. If the single probe is used for scanning, it is possible to scan the two-dimensional range of the passive ultrasonic tag 100 by moving the single probe along the representative surface 22 while making the representative surface 22 correspond to the surface of the passive ultrasonic tag 100.

The scanning method as shown in FIG. 3 was also adopted in a demonstration experiment. First, a sample was scanned one-dimensionally in the X direction using an ultrasonic beam at a frequency of 600 MHz thinned by an acoustic lens or the like using a scanning acoustic microscope (SAM). Next, transmission of an ultrasonic wave and reception of the reflected ultrasonic wave was repeated while shifting an ultrasonic beam in the Y direction. As a result, the structure of the passive ultrasonic tag 100 was successfully analyzed at a resolution of 1.7 μm in the depth direction.

Figure 4:
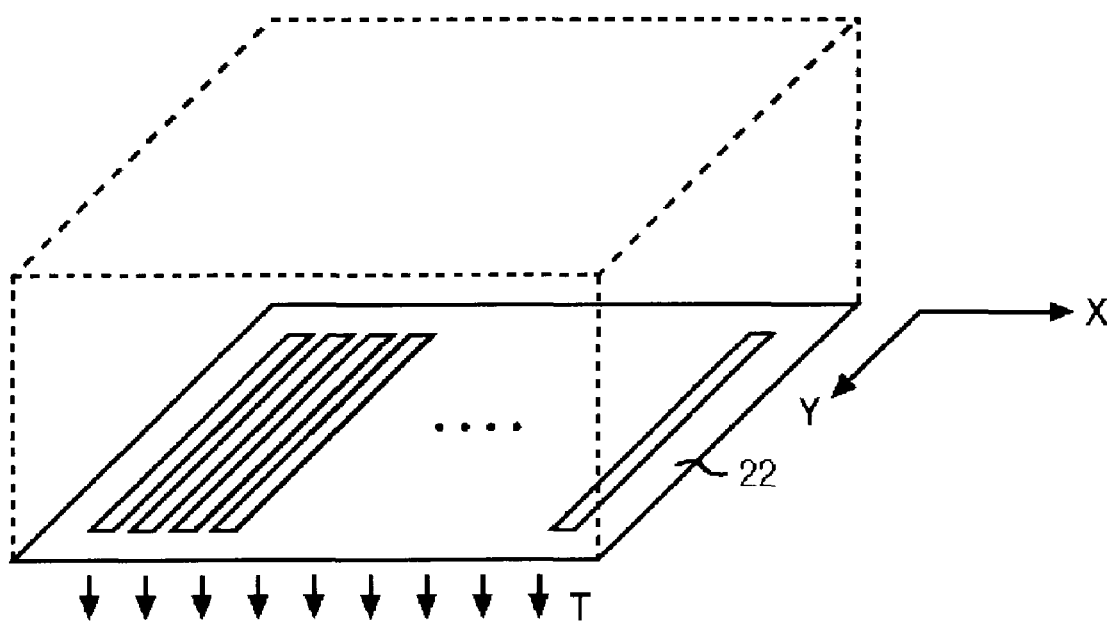

FIG. 4 is a schematic view showing the ultrasound transmitter realized using an array of elements. The ultrasonic reader 20 may include as the transmitter an array of elongated elements two-dimensionally disposed on the representative surface 22 as shown in the drawing. As such elements, for example, a plurality of piezoelectric vibrators (quartz crystal, etc.), electrostriction vibrators, or the like are used at a relatively high frequency. Magnetostrictive vibrators can also be used. Simultaneous transmission of ultrasound waves from the plurality of vibrators converges the wavefronts according to the Huygens-Fresnel principle. This allows an ultrasonic wave to travel straight a certain distance as a plane wave, thereby securing directivity.

Figure 5:
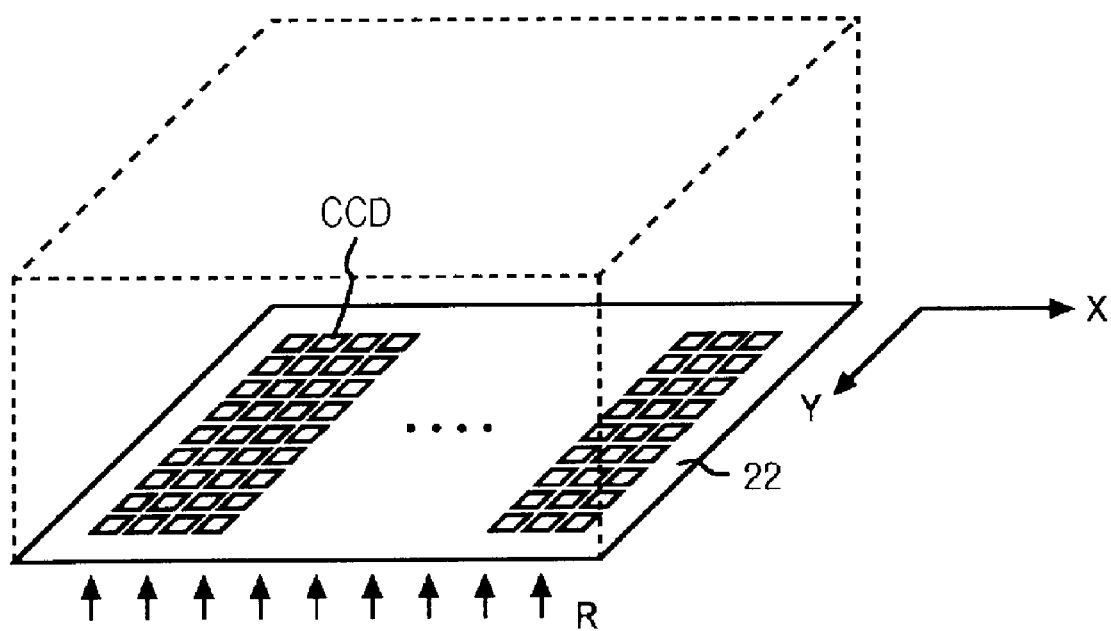

FIG. 5 is a schematic view showing the ultrasonic receiver realized using a charge coupled device (CCD) array. Disposing a CCD in an array allows reflected ultrasonic waves to be received two-dimensionally. For example, it is known that a CCD array capable of receiving ultrasonic waves has been used to obtain a perspective view (blood vessel) of a human body, a perspective view of a material, or the like using an ultrasonic microscope or ultrasonic flaw detector. For example, a CCD that is about 10×10 mm in size with a resolution of 0.08 mm can be used.

FIGS. 6(a) to 6(d) are drawings showing the passive ultrasonic tag 100 according to a first embodiment of this invention. FIG. 6(a) is an oblique perspective view. FIG. 6(b) is a drawing using a section so that the internal structure can be easily understood. The tag body 102 is made of a material having a predetermined density. However, it may not be made of a single material insofar as the predetermined density is suited for achieving reflection of ultrasonic waves. Various materials, such as a mixed material or a synthetic material, can be used.

A single hole or a plurality of holes are widely provided on the surface 104 of the tag body. Each hole has a bottom at a predetermined depth from the surface 104 of the tag body (z direction). In FIGS. 6(a) and 6(b), three holes 106, 108, and 110 are shown. These holes have bottoms 114, 116, and 112, respectively. The depths of these holes from the surface 104 (d0) of the tag body to the respective bottoms can be set up at different depths d1, d2, and d3, showing that these holes can be quantified.

These "holes" can be made using various processing methods such as drilling, melting by laser irradiation, MEMS stamping, or photolithography while controlling the depths. However, the "bottoms" generally bear a mark such as mark 117 or mark 118 shown in FIG. 6(d). Processing each bottom into a geometrically complete flat surface (complete cylinder bottom) such as bottoms 112, 114, and 116 shown in FIG. 6(b) and thereby correctly setting up and recording the depths d1, d2, and d3 may be ideal in terms of visualization as shown in FIG. 6(c), or the like. However, performing such ideal processing on each bottom is not realistic in terms of processing cost or the like. It is sufficient for these bottoms to serve as portions that cause reflection of an ultrasonic wave using the above-mentioned second property of an ultrasonic wave. Even processing marks such as the mark 117 or the mark 118 shown in the drawing can be used. The "bottoms" having other various processing aspects can also be set up.

According to the above-mentioned second property of an ultrasonic wave, an ultrasonic wave transmitted (to that position) is transferred from a propagation medium such as air to another propagation medium, that is, the tag body 102. Since the bottoms 112, 114, and 116 are boundaries in which the density markedly changes, an ultrasonic wave is reflected as shown by R1, R2, and R3. The positions reached by the reflected ultrasonic wave in a predetermined period of time are different as schematically shown by the tips of the arrows of R1, R2, and R3. Measuring the time period from the transmission of an ultrasonic wave from the reader 200 until the return of the reflected ultrasonic wave with respect to each hole position in this way allows the depth of each hole to be known. This principle is also known as the pulse-echo principle.

Figure 7:
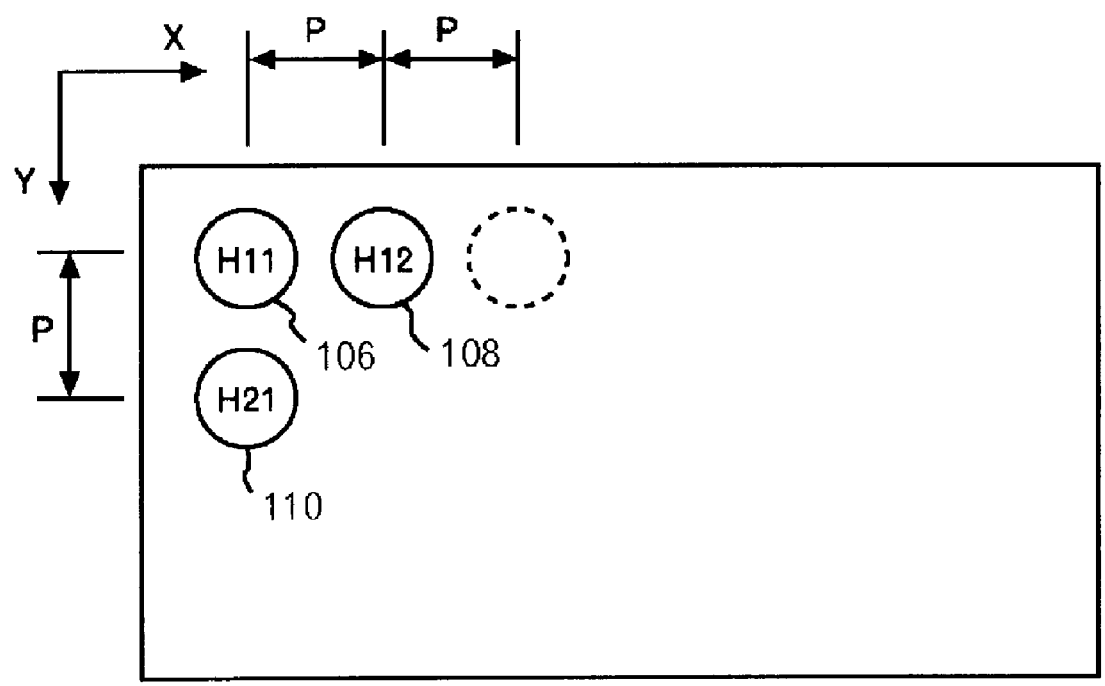
Figure 8:
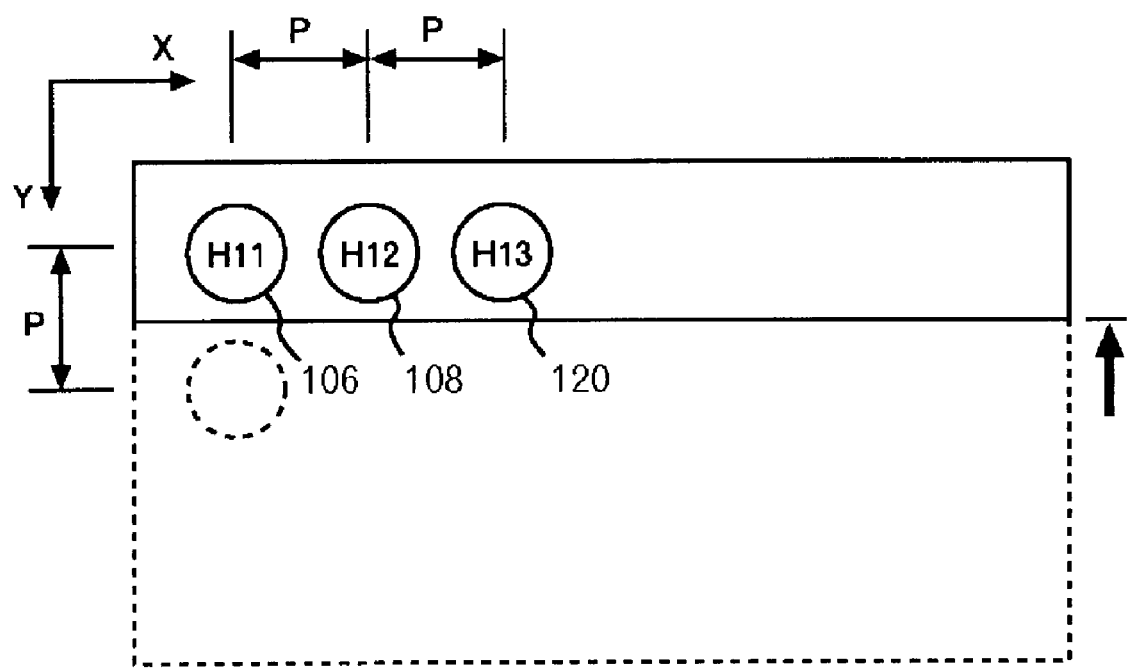

Assume that one hole exists in a certain two-dimensional coordinate area (XY) on the surface 104 of the tag body 104 and the depth (Z) of the hole can be set to one depth d1. This means that the existence or non-existence of a hole in a certain two-dimensional coordinate area (XY) can be checked. In FIGS. 7 and 8 discussed later, a solid circle denotes the existence of a hole; a dotted circle denotes the non-existence of a hole. A two-dimensional coordinate area (XY) allows coordinates (position for checking whether or not the hole exists) to be set up, for example, as a discrete amount such as a pitch P.

For example, assume that only the hole 110 exists and other holes (holes 106, 108) do not exist in FIGS. 6(a) and 6(b). This means that the following two quantified states (d0, d1) can be set up for the two-dimensional coordinate area (XY): (1) a state in which the hole 110 does not exist and (2) another state in which the hole exists with the depth d1 reaching the bottom 112. Since the hole can be constructed so that an ultrasonic wave is reflected in different ways such as R0 and R1, these two different states are readable and distinguishable and each constitute a unit of recordable digital information (equivalent to one bit). In other words, as the number of holes increases, the amount of recordable information increases. If n number of holes can be set up, (n-th power of 2) different kinds of information can be recorded.

Next, assume that one hole exists in a certain two-dimensional coordinate area (XY) on the surface 104 of the tag body 104 and the depth (Z) of the hole can be set to any one of three depths d1, d1, and d3. This means that the following four quantified states (d0, d1, d2, d3) can be set up to the two-dimensional coordinate area (XY): (1) a state in which the hole 108 is not made (does not exist); (2) a state in which the hole 108 exists with the depth d1; (3) a state in which the hole 108 exists with the depth d2; and (2) a state in which the hole 108 exists with the depth d3 reaching the bottom 116. Since the hole 108 can be constructed so that an ultrasonic wave is reflected in different ways such as R0, R1, R2, and R3, these four different states are readable and distinguishable. Thus, four different kinds of information can be recorded with respect to even one hole depending on the differences in depth. In addition, it will be possible to make various advantageous setups with respect to the depth of the hole in relation to the above-mentioned third property of an ultrasonic wave.

FIG. 6(c) schematically shows appearances in which the read states are visualized on the displays 30. In order to scan a three-dimensional range to read information, the following method is preferably used: Initially, an ultrasonic wave is transmitted from the transmitter to the two-dimensional range at a first depth (for example, any depth between d1 and d2) of the passive ultrasonic tag, and then the reflected ultrasonic wave is received by the receiver; next, the first depth is shifted to a second depth (for example, any depth between d2 and d3), then an ultrasonic wave is transmitted from the transmitter to the two-dimensional range at the second depth of the passive ultrasonic tag, and then the reflected ultrasonic wave is received by the receiver; and finally, comparison is made between the state of the ultrasonic wave in the two-dimensional range at the first depth and the state of the ultrasonic wave in the two-dimensional range at the second depth.

Now the number of pieces of information to be recorded will be obtained mathematically. If the L number of quantified states can be set up in the depth direction (Z) and if n number of holes can be set up (whether or not each hole is provided) in a two-dimensional coordinate area (XY), information can be recorded by the number of combinations obtained by the formula (2) below.

$$\text{Number of combinations} = n\text{-th power of} (L+1) \qquad (2)$$

Figure 6:
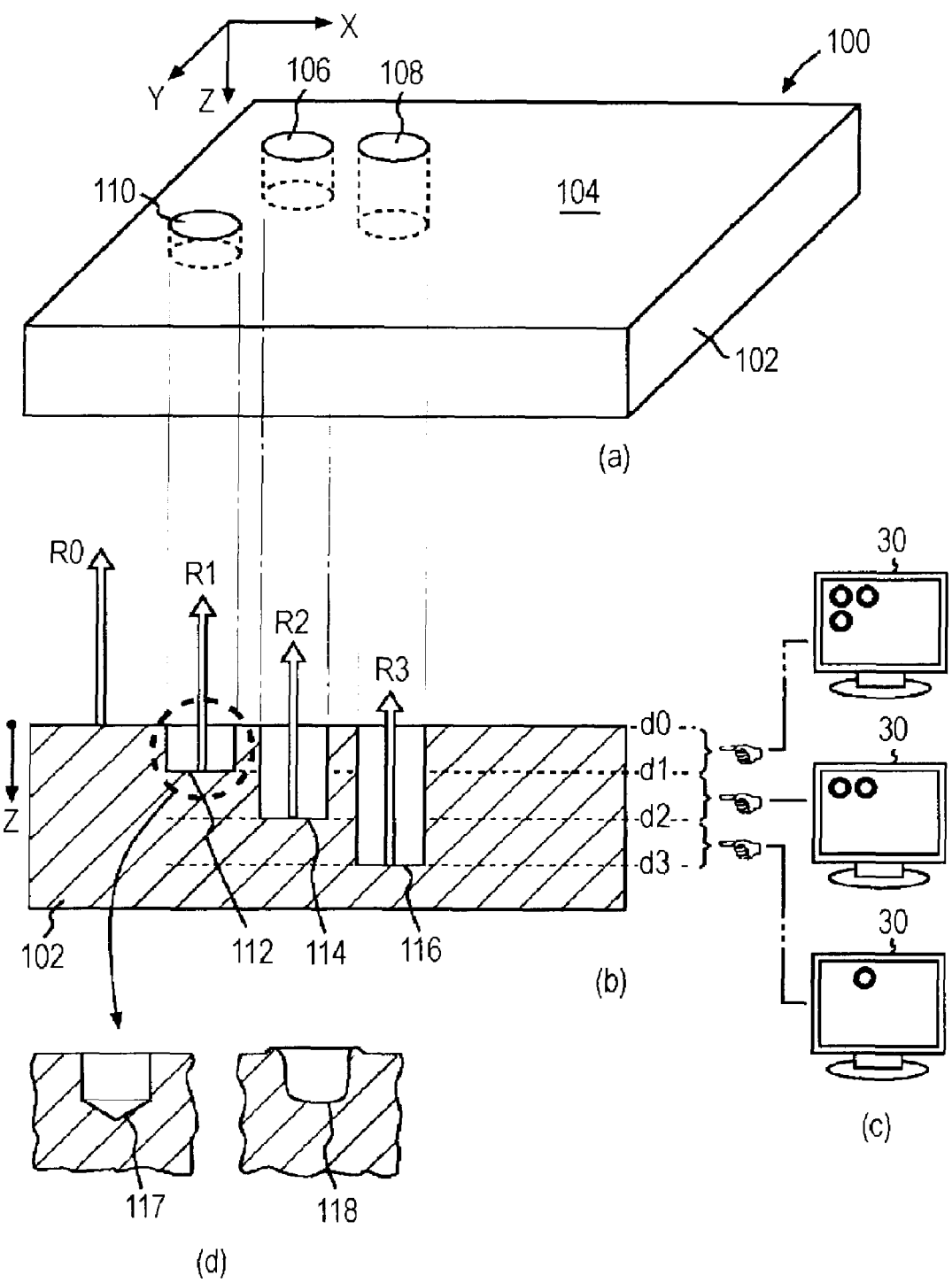

In the embodiment shown in FIG. 6, even though it is not verifiable whether coordinates are set up in a two-dimensional coordinate area (XY) (for example, the surface 104 of the tag body is irregular) and thereby none of R0≠R, R0≠R2, and R0≠R3 can be verified, if the depths of at least two of the holes 106, 108, and 110 are set up so as to be different from each other, that is, if any one of d1≠d2, d1≠d3, and d2≠d3 is set up, it is readable and distinguishable that R1≠R2, R1≠R3, or R2≠R3, thereby making recording of information meaningful. This is because the holes can be constructed so that ultrasonic waves are reflected in different ways. Also in such a case, information can be recorded by the number of combinations obtained by the formula (3) below.

$$\text{Number of combinations} = n\text{-th power of } L \qquad (3)$$

FIG. 7 is a plan view showing an example in which a plurality of holes are disposed two-dimensionally on the tag body. This is a plan view of the tag body surface 104 of FIG. 6(a) seen from the Z direction, in which the holes 106, 108, and 110 are depicted as holes 11, 12, and 21, respectively. This drawing shows an example in which a two-dimensional coordinate area (XY) is set up as a discrete amount such as the pitch P. Disposing the holes as a two-dimensional matrix H11, H12, and H21 that has a mathematical meaning (in the expression HXY, X represents a row, Y represents a column) in this way allows recording of information to be extended mathematically and two-dimensionally. This is convenient when recording information with a rectangular tag or a rectangular tag body used as a target.

FIG. 8 is a plan view showing an example in which a plurality of holes are disposed one-dimensionally on the tag body. In the drawing, the position of the hole 110 disposed two-dimensionally in FIG. 7 is indicated by a dotted line, meaning that the hole 110 is not present. Alternatively a hole 120 is disposed as an H13 in the X direction one-dimensionally. This is convenient when recording information with an elongated tag or an elongated tag body used as a target. Also, this is advantageous in that scanning can be finished only with one-dimensional scanning.

Figure 9:
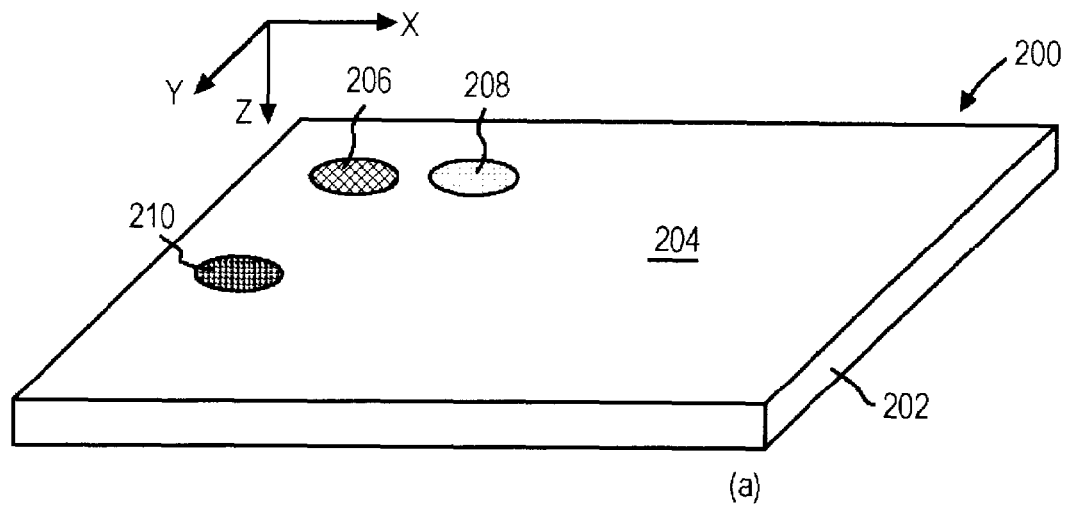
Figure 9:
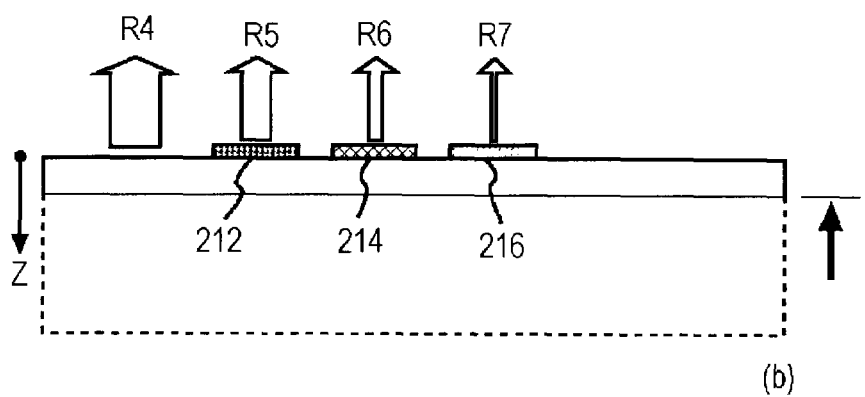
Figure 9:
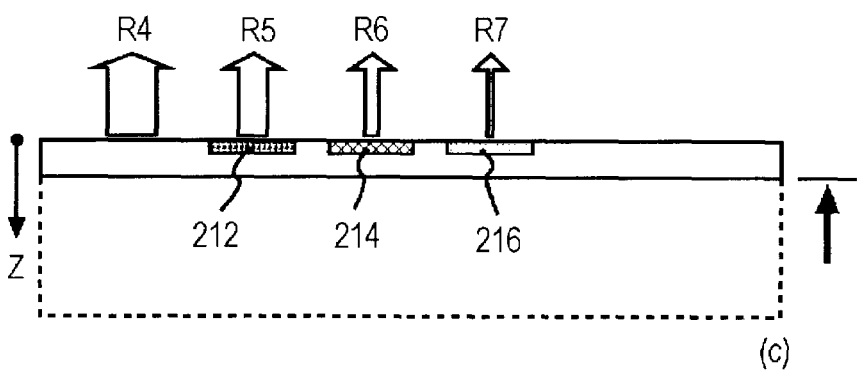

FIGS. 9(a) to 9(c) are drawings showing the passive ultrasonic tag 200 according to a second embodiment of this invention. The tag body 202 is made of a propagation medium having a predetermined density. However, it may not be made of a single material insofar as the predetermined density is suited for achieving reflection of an ultrasonic wave. Various materials, such as a mixed material or a synthetic material, can be used.

Surface portions 206, 208, and 210 having densities different from that of tag body 202 are distributed and disposed on the surface 204 of the tag body. The surface portions may be singular or plural. While these surface portions are depicted as protrusions having an extremely small thickness in a side view of FIG. 9(b), they may be embedded very slightly in the depth direction Z as shown in a side view of FIG. 9(c). In order to form the surface portions as shown in FIG. 9(b), a processing technique such as printing or coating with a propagation medium may be used. In order to form the surface portions as shown in FIG. 9(c), a processing technique such as baking or osmosis may be used.

The tag shown in FIG. 9(b) according to the present embodiment is one that includes three "protrusions" that are vertically symmetrical to the holes according to the first embodiment shown in FIG. 6(b) with respect to the surface 204 of the tag body.

It is important in the second embodiment that the respective densities of the tag body 202 and surface portions 206, 208, and 210 can be set up so as to be different from one another, whereby the reflection intensity (level) of an ultrasonic wave varies according to the above-mentioned second property of an ultrasonic wave.

If the intensity (level) of the reflected ultrasonic wave varies depending on the surface portions as schematically shown by thicknesses of the arrows R4, R5, R6, and R7, such variations are readable and distinguishable by the ultrasonic wave reader. It is also conceivable that an ultrasonic wave is observed in an aspect in which the waveform of the ultrasonic wave is shifted.

Here, even though the respective densities of the tag body 202 and surface portions 206, 208, and 210 cannot be set up quantitatively, various states can be set up insofar as variations in reflection are distinguishable with a preset threshold used as a reference.

An advantage of the second embodiment over the first embodiment is that the tag body 202 can be made thinner to a degree that there is no need to set up holes in the tag body 202 itself, as shown by the section enclosed by the dotted line in the drawing.

Figure 10:
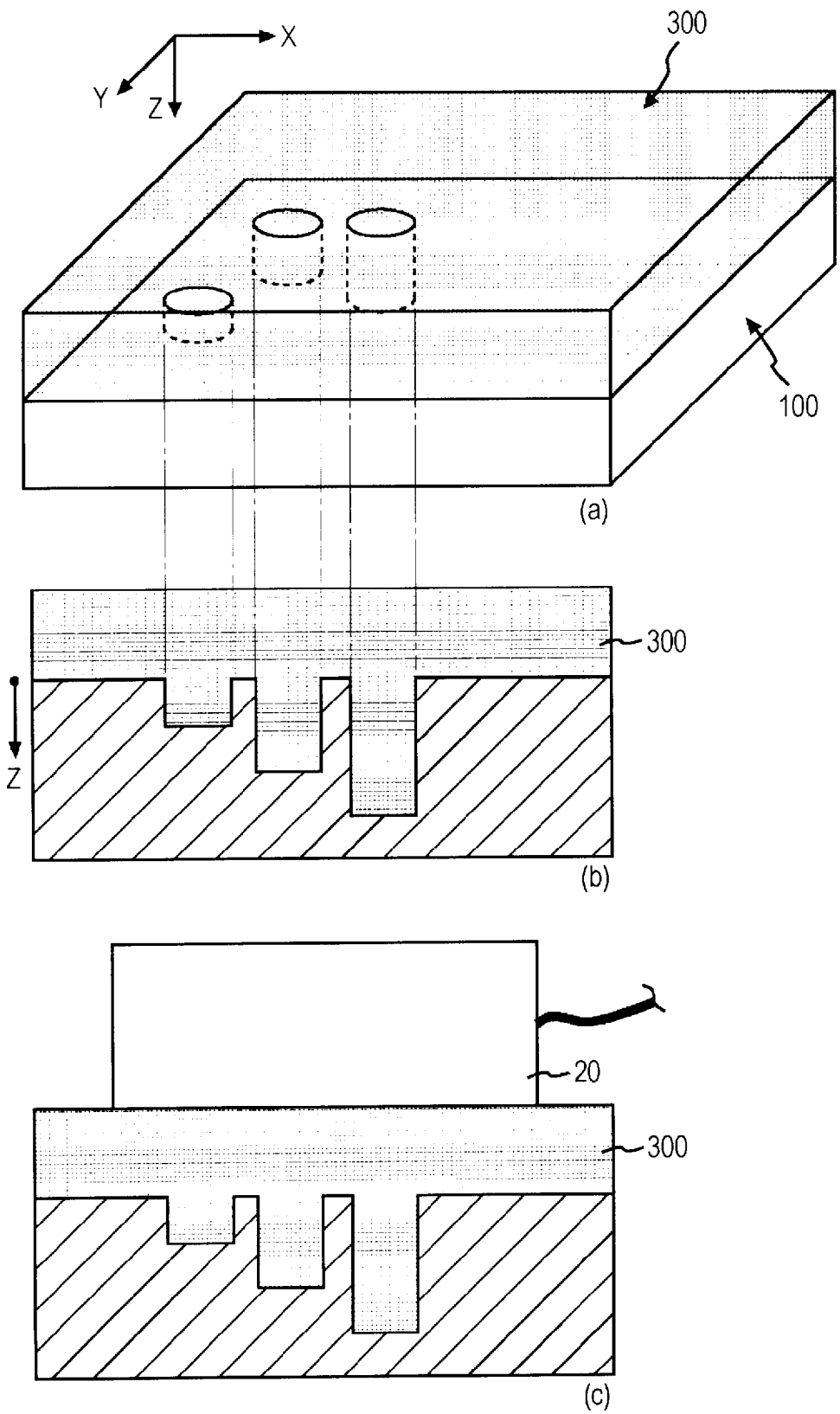

FIGS. 10(a) to 10(c) show a third embodiment that is an application example of the passive ultrasonic tag 100 according to the first embodiment of this invention. This embodiment is characterized in that all the holes shown in FIGS. 6(a) and 6(b), the holes 106, 108, and 110, are filled with a propagation medium 300 having a density different from that of the body 102 of the passive ultrasonic tag 100.

The "filled" state can be seen from FIG. 10(b) that is a side view. Filling the portion (thickness region) of the degree C of proximity shown in FIG. 1 with the propagation medium 300 prevents air or the like from lying between the reader and tag. In other words, selecting the propagation medium 300 properly according to the above-mentioned first property of an ultrasonic wave allows an ultrasonic wave to be transmitted efficiently. For example, in ultrasonic diagnoses in the medical field, gel made of a polymer, a surface-active agent, or the like is applied to a body surface of a test subject as an acoustic coupling agent because existence of air between the skin surface of the test subject and the probe causes an ultrasonic beam to be significantly attenuated. Such a function performed by the gel can be found in the functions of the propagation medium 300. As shown in FIG. 10(c), the ultrasonic reader 20 can be used with the reader directly in contact with the propagation medium 300.

Since all the holes shown in FIGS. 6(a) and 6(b), the holes 106, 108, and 110, are basically recesses, those holes are subject to surface contamination and are likely to store dust or the like. If these holes are filled with dust or the like, an ultrasonic wave may not be reflected as intended, causing a wrong reading. Therefore, filling all the holes with the propagation medium 300 can prevent such contamination from occurring. Moreover, the propagation medium 300 is advantageous in that the upper surface thereof can be formed into a neat, smooth surface. Further, the propagation medium 300 has applicability that cannot be achieved by RFID tags using electromagnetic waves, in that the propagation medium 300 can be made of metal and thereby embedded in metal.

Figure 11:
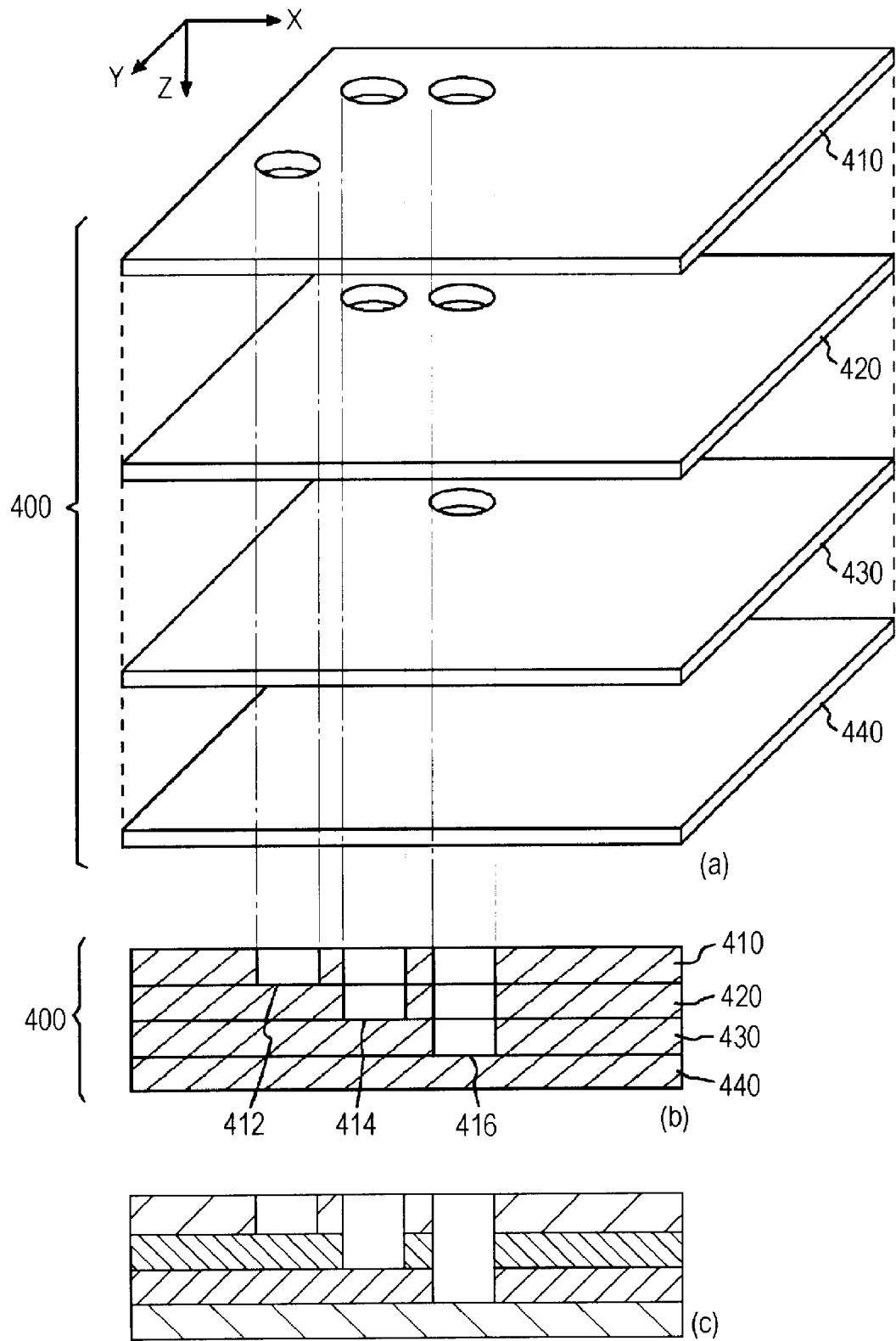

FIG. 11(a) is an exploded view detailing a method of (according to a fourth embodiment) of constructing the passive ultrasonic tag 100 according to the first embodiment of this invention. In order to form portions corresponding to the holes 106, 108, and 110 shown in FIGS. 6(a) and 6(b), holes are previously made in each of layers 410, 420, and 430, and these layers are stacked so that those holes are aligned. As a result, as shown in FIG. 11(b), a multilayer body 400 can be achieved in which bottoms 412, 414, and 416 are made up of a surface portion of the layers 420, 430, and 440, respectively, thereby becoming a geometrically ideal, completely flat surface (complete cylinder bottom).

Moreover, the accuracy of the depths of the holes is correctly controlled by the respective thicknesses of the layers 410, 420, and 430 themselves. This is considerably advantageous in that d1=d2=d3 can be achieved in an ideal fashion. As a matter of course, d1=d2=d3 may be set up or d1≠d2− d1≠d3−d2 may be set up.

Furthermore, as shown in FIG. 11(c), if the layers 410, 420, and 430 themselves are made of propagation media having different densities, an embodiment obtained by combining the first embodiment shown in FIGS. 6(a) and 6(b) and the second embodiment shown in FIGS. 9(a) to 9(c) can be easily achieved, allowing information to be recorded in more states. This is considerably advantageous. Even though any one of these layers is made of a propagation medium having a density different from those of other layers, the number of pieces of information to be recorded may be sufficient.

Figure 12:
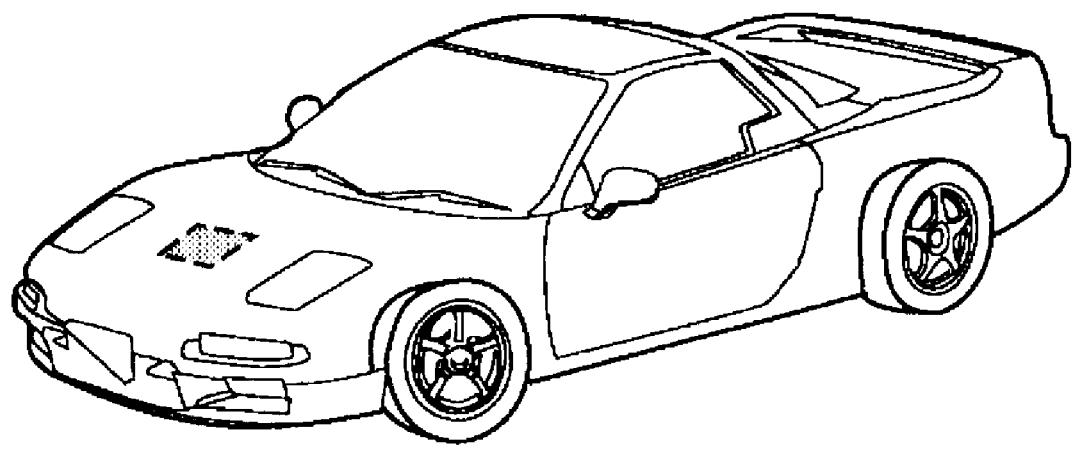

FIG. 12 is a drawing showing an application example in which a passive ultrasonic tag according to this invention is attached to an automobile. If the tag is exposed to the outside of the automobile, the automobile is disfigured, so the tag should be hidden by disposing the tag in a concealed position, e.g., inside the bonnet. Recent automobiles are electronically controlled in a complicated fashion and thereby serve as a source of electromagnetic waves. Also, the space below the bonnet is subject to high temperature due to a heat source such as an engine or emission control device. Thus, the area near the bonnet is a harsh environment that causes stress. Disposing the ultrasonic tag according to this invention inside the bonnet or the like allows information stored in the tag to be read by the ultrasonic reader from over the bonnet without requiring the bonnet or adjacent components to be removed and further without requiring the bonnet even to be opened. Moreover, this invention can be applied to the bonnet itself or any component thereof included in the bonnet using the bonnet or component as a tag body.

Figure 13:
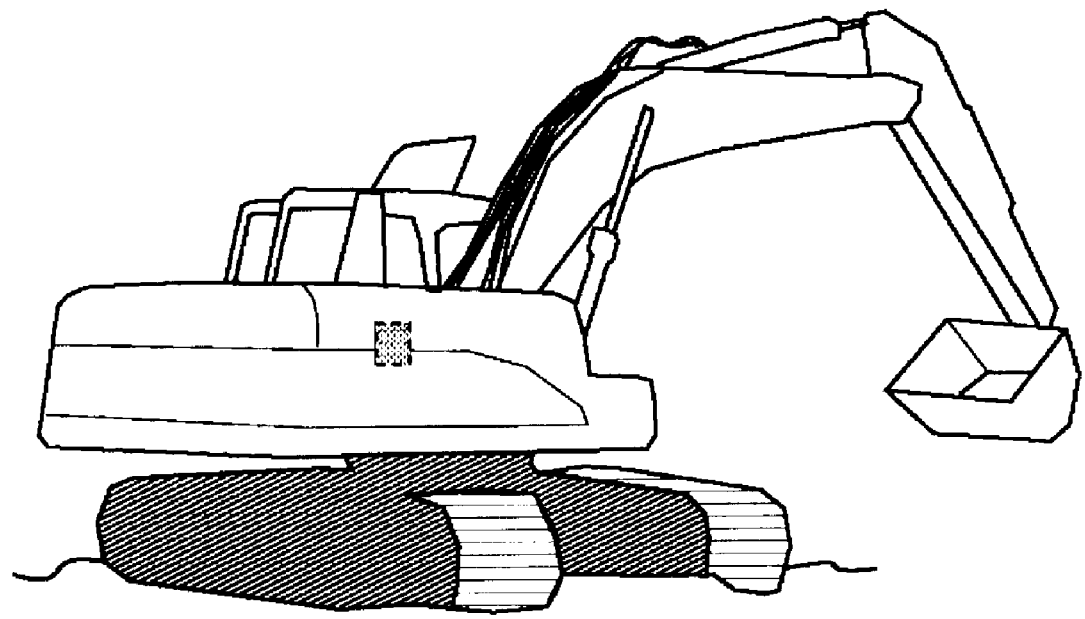

FIG. 13 is a drawing showing an application example in which a passive ultrasonic tag according to this invention is attached to construction heavy equipment. Construction heavy equipment is often used under a harsh environment and is subject to much vibration during its operation. Thus, if the tag is attached to the surface of the equipment, the tag may fall off. Moreover, since such equipment is often covered with soil or mud, exposition of the tag outside the equipment may cause the tag surface to be subjected to oxidation. Therefore, disposing the passive ultrasonic tag according to this invention inside the equipment allows reliability to be maintained even under such an environment.

BRIEF DESCRIPTION OF THE DRAWINGS

Figure 1:
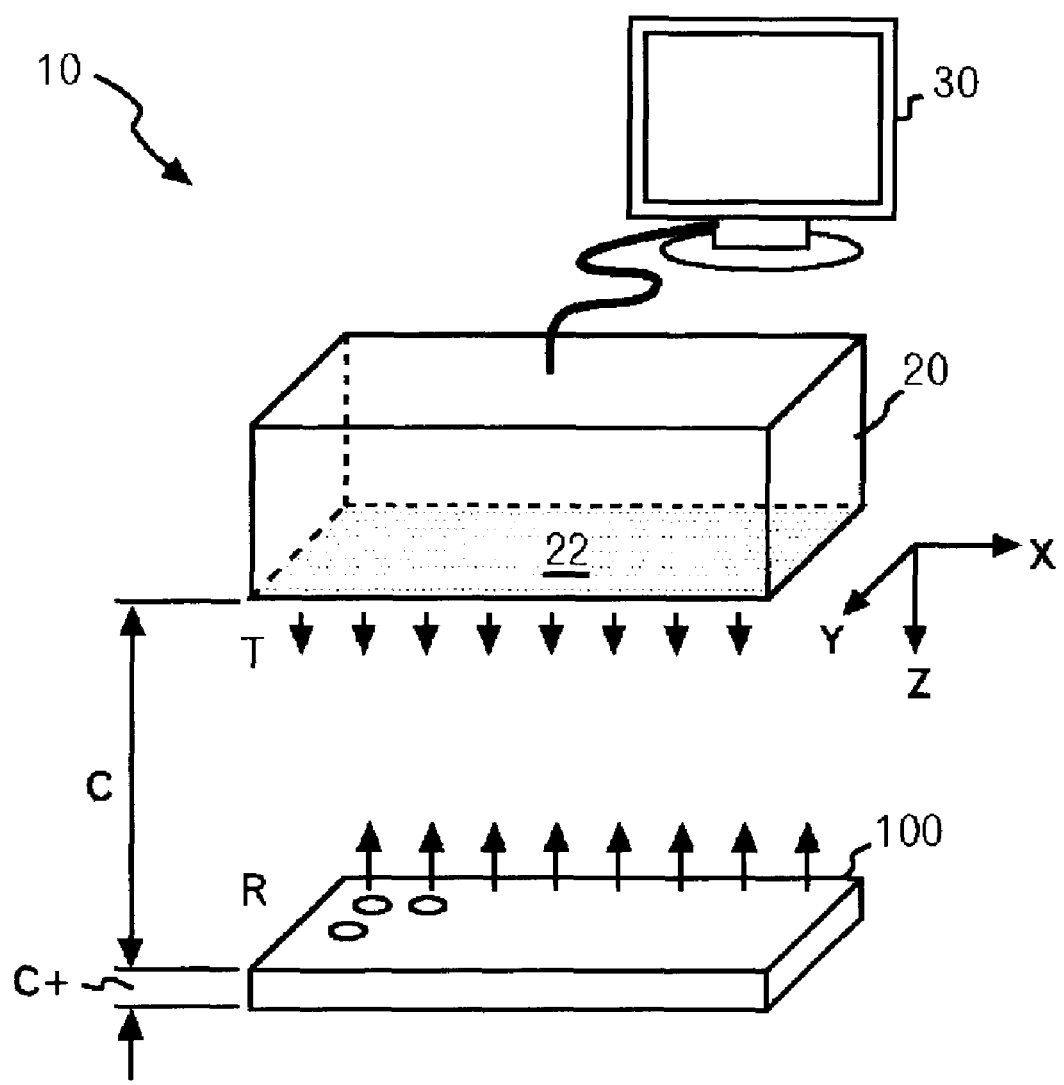
FIG. 1 is a basic block diagram showing an ultrasound reading system 10 using ultrasonic waves for transmission/reception. An ultrasonic wave is transmitted in a direction such as an arrow T via a representative surface 22 of an ultrasound reader 20. A passive ultrasonic tag 100 is scanned by the transmitted ultrasonic wave. The ultrasonic wave is reflected from the passive ultrasonic tag 100 in a direction such as an arrow R. The reflected ultrasonic wave is received and observed by the representative surface 22 of the ultrasound reader 20.

FIG. 1 is a basic block diagram showing an ultrasound reading system 10 that transmits/receives ultrasonic waves.

FIG. 2 is a schematic block diagram of the ultrasound reading system 10 centering on an ultrasonic reader 20.

FIG. 3 is a schematic view showing scanning performed by a single probe.

FIG. 4 is a schematic view showing an ultrasound transmitter realized using an element array.

FIG. 5 is a schematic view showing an ultrasound receiver realized using a charge-coupled device (CCD) array.

FIGS. 6(a) to 6(d) are drawings showing a passive ultrasonic tag 100 according to a first embodiment of this invention.

FIG. 7 is a plan view showing an example in which a plurality of holes are disposed two-dimensionally on a tag body.

FIG. 8 is a plan view showing an example in which a plurality of holes are disposed one-dimensionally on the tag body.

FIGS. 9(a) to 9(c) are drawings showing a passive ultrasonic tag 200 according to a second embodiment of this invention.

FIGS. 10(a) to 10(c) are drawings showing a third embodiment that is an application example of the passive ultrasonic tag 100 according to the first embodiment of this invention.

FIGS. 11(a) to 11(c) are drawings showing a fourth embodiment for achieving the construction of the passive ultrasonic tag 100 according to the first embodiment of this invention.

FIG. 12 is a drawing showing an application example in which a passive ultrasonic tag according to this invention is attached to an automobile.

FIG. 13 is a drawing showing an application example in which a passive ultrasonic tag according to this invention is attached to construction heavy equipment.

REFERENCE NUMERALS

10: ultrasound reading system
20: ultrasound reader
22: representative surface
24: AD/DA conversion circuit
26: control circuit
28: computation circuit
29: image processing circuit
30: display
100: passive ultrasonic tag (first embodiment)
102: tag body
104: surface of tag body
106, 108, 110, 120: holes
112, 114, 116: bottoms
117, 118: processing marks on bottom
200: passive ultrasonic tag (second embodiment)
202: tag body
204: surface of tag body
206, 208, 210: surface portions
300: propagation medium (third embodiment)
400: multilayer body (fourth embodiment)
410, 420, 430, 440: layers

The invention claimed is:

1. A method for reading information by scanning a three-dimensional range of a passive ultrasonic tag (100) comprising: a tag body (102), and having two or more holes (106, 108, 110) disposed extensively on a surface (104) of the tag body, the holes having bottoms (112, 114, 116), the bottoms at predetermined depths dimensions (d1, d2, d3) from the surface of the tag body (z), within the tag body, wherein depth dimensions of at least two of the two or more holes are set to different values (d1≠d2, d1≠d3, or d2≠d3), when a scan of ultrasonic waves is received across a three-dimensional range (104 to C+) including surfaces and bottoms of the two holes, the reflections of the ultrasonic waves will differ (R1, R2, R3) based on settings of the bottoms of the two holes, wherein:

the two or more holes (106, 108, 110) are aligned superimposed on openings that are opened in advance in two or more layers (410, 420, 430), comprising:

across a two-dimensional range at a first depth:

a step of transmitting ultrasonic waves from a transmitter to the passive ultrasonic tag; and a step of receiving the reflected ultrasonic waves by a receiver; and a step of changing the first depth to a second depth; and across a two-dimensional range at a second depth:

a step of transmitting ultrasonic waves from a transmitter to the passive ultrasonic tag; and a step of receiving the reflected ultrasonic waves by a receiver; and a step of making a comparison between a reception state of ultrasonic waves in the two-dimensional range at the first depth and a reception state of ultrasonic waves in the two-dimensional range at the second depth.

\* \* \* \* \*